(No Model.)
R. CROMMER.
TROLLEY POLE FOR RAILWAY CARS.
No. 546,303. Patented Sept. 17, 1895.
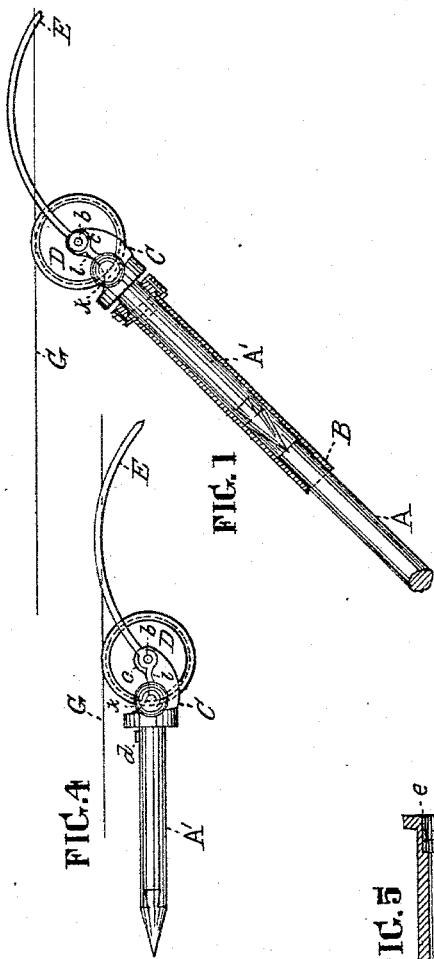
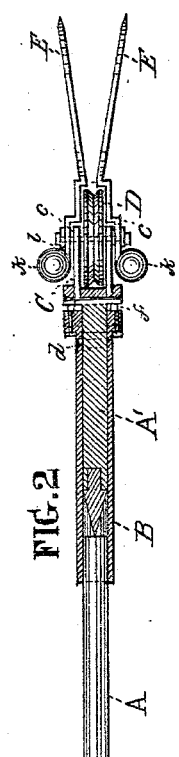
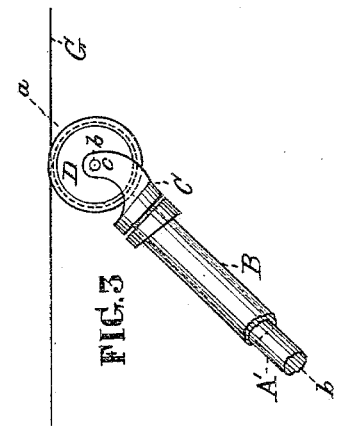
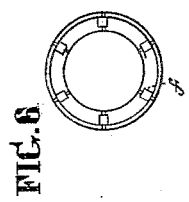
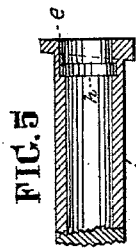
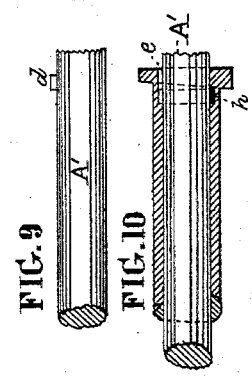
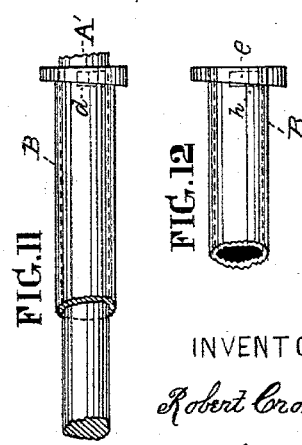
WITNESSES.
S. E. W. Bewley.
H. G. Garwood.
INVENTOR.
Robert Crommer
per Thomas J. Bewley, Atty.

UNITED STATES PATENT OFFICE.

ROBERT CROMMER, OF PHILADELPHIA, PENNSYLVANIA, ASSIGNOR OF ONE-HALF TO JAMES STEWART, JR., OF SAME PLACE.

TROLLEY-POLE FOR RAILWAY-CARS.

SPECIFICATION forming part of Letters Patent No. 546,303, dated September 17, 1895.

Application filed January 29, 1895. Serial No. 536,517. (No model.)

*To all whom it may concern:*

Be it known that I, ROBERT CROMMER, a citizen of the United States, residing at Philadelphia, in the county of Philadelphia and State of Pennsylvania, have invented a new and useful Improvement in Trolley-Poles for Railway-Cars, of which the following is a specification.

The improvement consists in a pivotal rod connected to the upper end of the main portion of the trolley-pole, which pivotal rod has an inverted cone upon its lower end, whose apex bears upon the surface of the upper end of said main portion, said pivotal rod or attachment to the main portion being surrounded by an incasing sleeve rigidly connected at its lower end to the trolley-pole by any suitable locking device for maintaining the two portions in contact with each other. This sleeve is provided with a flange upon its upper end. Upon the upper and exposed end of the pivotal rod is a flange consisting of an obliquely-truncated cylinder carrying the bracket for supporting the trolley-wheel, which revolves upon a journal having bearings in said bracket. The bracket is provided with a pair of curved projecting forked arms pivotally with journal carrying the trolley-wheel and which are counterbalanced to straddle the wire by means of weights upon their inner extremities. The locking device for connecting the pivotal rod and sleeve together consists of a lug projected from the side of said rod, which enters and passes through an internal longitudinal groove of the end of the sleeve, into which the lug slides a short distance, when the lug meets a corresponding groove formed at right angles to that previously mentioned, into which the lug passes when the sleeve is partially revolved, thereby locking the rod and sleeve together.

In the accompanying drawings, which make a part of this specification, Figure 1 is a longitudinal section of the improved trolley-pole, taken through the line *a b* of Fig. 2. Fig. 2 is a like view taken at right angles to that shown in Fig. 1. Fig. 3 is a side elevation of the upper end of the pivotal rod A' with the trolley-wheel D in the bracket or head C. Fig. 4 is a side view of the trolley-wheel D, the forked arms E, and the pivoted point-rod A'. Fig. 5 is a longitudinal section of the forward end of the sleeve. Fig. 6 is a face view of the flange of the bracket C, showing the series of intermediate friction-rollers *f*. Fig. 7 is a cross-section of the forward end of the pivotal rod A', showing the lug or projection *d*. Fig. 8 is a view of the end of the sleeve B. Fig. 9 is a side view of the forward end of the pivotal rod A'. Fig. 10 is a side view of same in connection with a corresponding section of the sleeve B. Fig. 11 is a side view of the end portion of the pivotal rod A' within the sleeve. Fig. 12 is a side view of forward end of sleeve.

Like letters of reference in all the figures indicate the same parts.

A is the trolley-pole, which is destined to be connected at its lower extremity to the roof of a car. To the upper extremity of the pole A is connected the sleeve B, which surrounds the forward end portion of the pole circumferentially and is rigid therewith. Within this sleeve is situated the pivotal rod A', having a conical lower end whose point rests upon the crown of the trolley-pole A to permit of an easy swivel movement thereon. The outer and upper end of this rod A' carries upon its extremity the bracket or head C, provided with the peripheral grooved trolley-wheel D, supported on the journals *b* in the lugs *c* of said head. Having pivotal connection on the journals *b* outside of the lugs *c* are the flaring arms or prongs E, (seen in Figs. 1, 2, and 4,) which straddle the electrical wire G and assist in guiding and retaining the trolley-wheel D in connection therewith. These arms are balanced to retain them in their upright position by means of the weights *k* on the arms *l*, the preponderance of weight in the lower portion of the bracket or head C retaining the groove in the trolley-wheel D in a parallel line with the electrical wire G to readily form contact therewith. The flange of the sleeve has also a preponderance of weight upon its lower portion, so that when the projection *d* of the pivotal rod A' is inserted within the slot *e* of the sleeve B, the weight being upon one portion of said flange draws said rod around until the weight is upon the under side. The pivotal rod is secured within the sleeve by its insertion therein, the projection or lug *d* of the rod passing into and through the slot *e* of said sleeve until it reaches the cross-channel *h*, when the lug *d* enters the latter and is drawn around therein by the partial revolution of the rod, which locks and secures the latter in place.

What I claim herein as new, and desire to secure by Letters Patent, is—

1. The pivotal rod A', having the conical point upon its lower end, and provided with the bracket, or head C, having a truncated flanged base, the trolley wheel D, hung on the journals *b*, in the lugs *c*, and the forked arms E, pivoted on said journals, and provided with balance weights *k*, on the studs, or posts *l*, *l*, for guiding and retaining the trolley wheel upon the wire, substantially in the manner and for the purpose herein shown and described.

2. The pivotal rod A', provided with the bracket C, carrying the trolley wheel D, upon its outer end, in combination with the sleeve B, secured to the trolley by means of the lug *d*, slot *e*, and channel *h*, substantially in the manner herein shown and described for the purpose set forth.

ROBERT CROMMER.

Witnesses:
THOMAS J. BEWLEY,
J. R. MASSEY.